US009074619B2

(12) United States Patent
Yamauchi et al.

(10) Patent No.: US 9,074,619 B2
(45) Date of Patent: Jul. 7, 2015

(54) TERMINAL SUPPORT DEVICE MOUNTING STRUCTURE

(75) Inventors: Akitomo Yamauchi, Takarazuka (JP); Hiroshi Sonobe, Takarazuka (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 14/238,172

(22) PCT Filed: Aug. 10, 2012

(86) PCT No.: PCT/JP2012/070567
§ 371 (c)(1),
(2), (4) Date: Feb. 10, 2014

(87) PCT Pub. No.: WO2013/022105
PCT Pub. Date: Feb. 14, 2013

(65) Prior Publication Data
US 2014/0157941 A1    Jun. 12, 2014

(30) Foreign Application Priority Data
Aug. 11, 2011    (JP) .................................. 2011-176131

(51) Int. Cl.
*F16C 1/10*    (2006.01)

(52) U.S. Cl.
CPC ........... *F16C 1/101* (2013.01); *Y10T 74/20462* (2015.01); *F16C 1/105* (2013.01); *F16C 2361/65* (2013.01)

(58) Field of Classification Search
CPC ...... F16C 1/105; F16C 1/101; F16C 2226/74; F16C 1/262
USPC ......................... 74/502.4, 502.6; 248/27.3, 56
See application file for complete search history.

(56) References Cited

U.S. PATENT DOCUMENTS

| 5,613,406 | A | 3/1997 | Rutkowski |
| 6,340,265 | B1 * | 1/2002 | Suzuki et al. ................. 403/316 |
| 6,634,252 | B2 * | 10/2003 | Mayville et al. ............. 74/502.6 |
| 2007/0218743 | A1 * | 9/2007 | Ruhlander et al. ............ 439/352 |
| 2011/0155457 | A1 * | 6/2011 | Horinaka ....................... 174/659 |
| 2012/0066870 | A1 * | 3/2012 | Quaglia et al. ............... 24/122.3 |

FOREIGN PATENT DOCUMENTS

| JP | 09-189320 A | 7/1997 |
| JP | 10-110718 A | 4/1998 |
| JP | 11-173322 A | 6/1999 |
| JP | 2002-089536 A | 3/2002 |
| JP | 2002122271 (A) | * 4/2002 ................ F16C 1/10 |

OTHER PUBLICATIONS

EP Bibliographic data of JP2002122271 (A), Masaki, Apr. 2002.*
International Search Report, PCT/JP2012/070567, Sep. 4, 2012.

* cited by examiner

*Primary Examiner* — Vinh Luong
(74) *Attorney, Agent, or Firm* — Studebaker & Brackett PC

(57) ABSTRACT

A terminal support device mounting structure has a terminal support device and a bracket. The bracket has an opening, a mounting hole, a thick portion, and an engagement portion. The thick portion is located around the opening and the mounting hole. The engagement portion is provided to extend from the thick portion in an axial line direction X. The terminal support device has a socket. The socket has a mounted portion having an introduction portion and a sliding contact portion, a pair of flanges, a flexible portion having a pawl and an arm, and a rotation restriction portion. The pawl is engaged with the engagement portion during rotation. The arm supports the pawl such that the pawl can be engaged with the engagement portion. The rotation restriction portion restricts rotation of the socket after rotation causes the pawl to pass over the engagement portion.

6 Claims, 9 Drawing Sheets

(a)

(b)

(a)

(b)

(a)

(b)

TERMINAL SUPPORT DEVICE MOUNTING STRUCTURE

TECHNICAL FIELD

The present invention relates to a terminal support device mounting structure, and more particularly to a terminal support device mounting structure for fixing an end portion of a control cable having an inner cable slidably inserted through an outer casing.

BACKGROUND ART

When the gear ratio of the transmission in the engine room of automobiles is changed by the select lever in the operation room, the transmission is remotely operated through a control cable. An end portion of the control cable is fixed by a terminal support device, which is mounted on the vehicle body by a bracket.

Japanese Patent Laying-Open No. 9-189320 (Patent Document 1) describes a method of fixing a motion transmitting remote control assembly to a wall, by inserting the motion transmitting remote control assembly (corresponding to the above-noted terminal support device) provided with an arm having a projection, into an opening on a wall (corresponding to the above-noted bracket) having a retainer, and by rotating the motion transmitting remote control assembly about the axial direction.

According to this fixing method, when the motion transmitting remote control assembly is mounted on a wall, the projection of the arm is rotated while sliding on the surface of the wall. When the projection reaches the retainer, the projection is seated in the retainer, whereby the motion transmitting remote control assembly is fixed to the wall.

CITATION LIST

Patent Document

PTD 1: Japanese Patent Laying-Open No. 9-189320

SUMMARY OF INVENTION

Technical Problem

According to the fixing method described in Patent Document 1, when the motion transmitting remote control assembly is rotated, the projection of the arm slides on the surface of the wall over a long distance. Therefore, the resistance of the wall against the arm may increase to break the arm. Likewise, when the motion transmitting remote control assembly is removed from the wall, the arm is reversely rotated while sliding on the surface of the wall over a long distance, which may cause breakage of the arm.

A stopper provided in the motion transmitting remote control assembly is arranged to be flush with a wall when the motion transmitting remote control assembly is inserted in an opening of the wall to be fixed.

Therefore, when the motion transmitting remote control assembly is inserted in the opening of the wall and the motion transmitting remote control assembly is then rotated, the stopper abuts on a side surface of the wall thereby restricting the rotation. Accordingly, the motion transmitting remote control assembly may fail to rotate 90 degrees, and the motion transmitting remote control assembly may drop off from the wall.

A main object of the present invention is therefore to provide a terminal support device mounting structure capable of preventing breakage of the arm and preventing the terminal support device from dropping off from the bracket.

Solution to Problem

A terminal support device mounting structure according to the present invention includes a terminal support device and a bracket. The terminal support device is for fixing an end portion of a control cable having an inner cable slidably inserted through an outer casing. The bracket is for mounting the terminal support device through rotation about an axial line thereof. The bracket includes an opening, a mounting hole, a thick portion, and an engagement portion. The mounting hole is in communication with the opening and has an arc-shaped portion with a diameter larger than a width of the opening. The thick portion is located around the opening and the mounting hole. The engagement portion is provided to extend from the thick portion in the axial line direction. The terminal support device includes a socket. The socket includes a mounted portion having an introduction portion and a sliding contact portion, a pair of flanges, a flexible portion having a pawl and an arm, and a rotation restriction portion. The introduction portion is provided so as to be able to be introduced into the opening. The sliding contact portion has a width larger than the width of the opening for coming into sliding contact with the arc-shaped portion during the rotation. The pair of flanges is provided so as to sandwich the mounted portion therebetween for sandwiching the thick portion on the periphery of the mounting hole during the rotation. The pawl is engaged with the engagement portion during the rotation. The arm supports the pawl such that the pawl can be engaged with the engagement portion. The rotation restriction portion restricts rotation of the socket after the rotation causes the pawl to pass over the engagement portion. The rotation restriction portion is provided so as to be able to restrict rotation of the socket by coming into abutment with the engagement portion. The arm and the pawl are located at a position spaced apart from the thick portion in the axial line direction during the rotation.

In the terminal support device mounting structure according to the present invention, the arm and the pawl provided in the socket are located at a position spaced apart from the thick portion of the bracket in the axial line direction. Accordingly, when the terminal support device is mounted on the bracket, the pawl does not slide on the surface of the thick portion of the bracket over a long distance, thereby eliminating the possibility that the arm is broken. Likewise, when the terminal support device is removed from the bracket, there is no possibility that the arm is broken.

The rotation restriction portion is provided to be able to restrict rotation of the socket by coming into abutment with the engagement portion. The engagement portion is a portion that is not flush with the thick portion, and the rotation restriction portion provided so as to come into abutment with the engagement portion is also not flush with the thick portion. Accordingly, the rotation restriction portion does not come into abutment with the side surface of the bracket and not restrict rotation of the socket, so that the socket can be rotated 90 degrees. This can prevent the terminal support device from dropping off from the bracket.

In the terminal support device mounting structure as described above, preferably, the engagement portion is a projection. The pawl is formed so as to be engaged with the engagement portion to prevent rotation in an opposite direction to a mounting direction when the socket rotates in the opposite direction to the mounting direction.

Therefore, the terminal support device can be prevented from rotating in the opposite direction to the mounting direction, thereby preventing the terminal support device from dropping off from the bracket.

In the terminal support device mounting structure as described above, preferably, when the socket is assembled with the bracket, the engagement portion of the bracket lies between the pawl and the rotation restriction portion.

Therefore, the terminal support device can be prevented from rotating in the opposite direction to the mounting direction and from further rotating beyond the normal mounting position, thereby preventing the terminal support device from dropping off from the bracket.

Advantageous Effects of Invention

In the terminal support device mounting structure according to the present invention, the arm and the pawl are provided to be spaced apart from the thick portion of the bracket in the axial line direction. This can prevent breakage of the components when the socket is mounted on the bracket. Since the socket can be rotated 90 degrees, the dropping off of the terminal support device from the bracket can be prevented.

DESCRIPTION OF EMBODIMENTS

Embodiments of the present invention will be described below based on the drawings. It is noted that in the following drawings, the same or corresponding parts are denoted with the same reference signs, and a description thereof is not repeated.

First, a construction of a terminal support device mounting structure in an embodiment of the present invention will be described with reference to FIG. 1 to FIG. 6.

Figure 1:
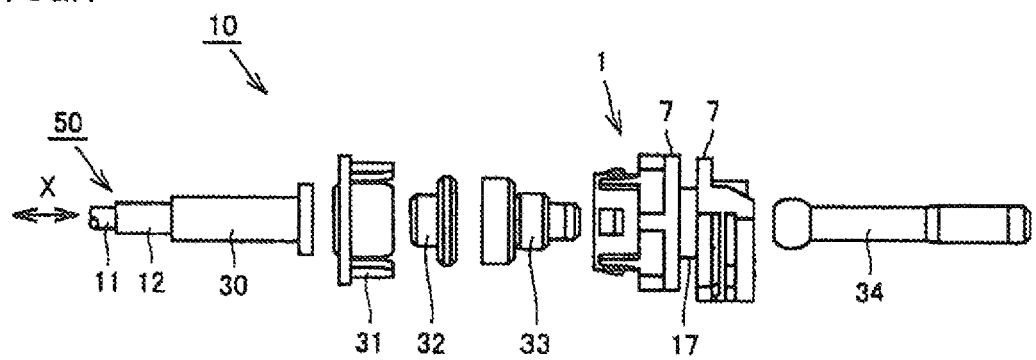
FIG. 1 is a diagram schematically showing a construction of a terminal support device of a terminal support device mounting structure in an embodiment of the present invention.
Figure 2:
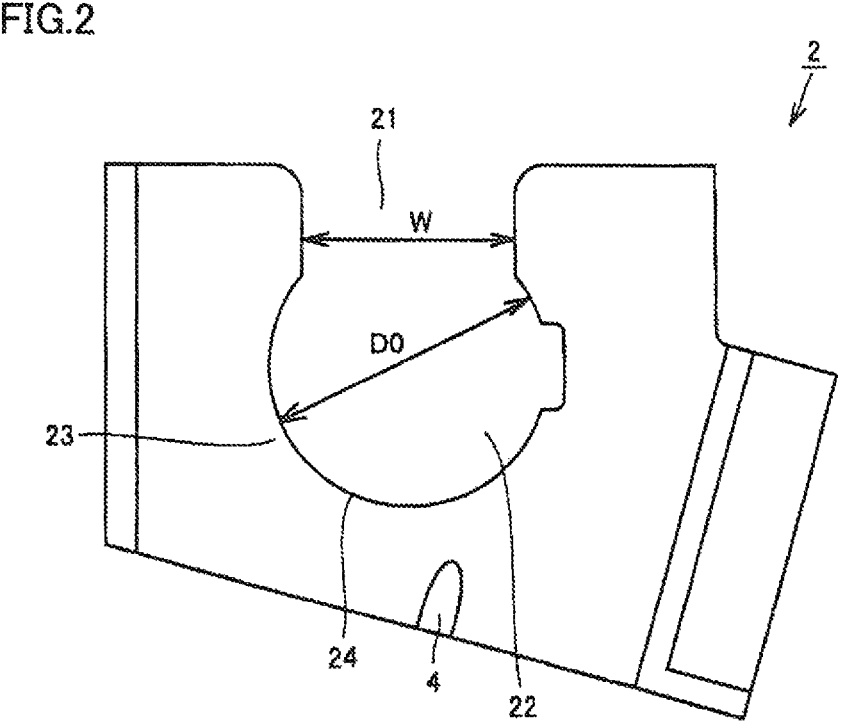
FIG. 2 is a plan view schematically showing a construction of a bracket of the terminal support device mounting structure in an embodiment of the present invention.

Referring to FIG. 1 and FIG. 2, the terminal support device mounting structure in the present embodiment has a terminal support device 10 (FIG. 1) and a bracket 2 (FIG. 2). Terminal support device 10 is mounted on an end portion of a control cable 50 for fixing the end portion of control cable 50, for example, to a vehicle body. Bracket 2 is to be mounted with terminal support device 10, and the mounting is carried out by rotating terminal support device 10 about an axial line relative to bracket 2. That is, terminal support device 10 that is fixed to the control cable 50 side is mounted through rotation on bracket 2 that is fixed to, for example, the vehicle body side, thereby allowing control cable 50 to be fixed to, for example, the vehicle body.

Referring to FIG. 1, terminal support device 10 described above mainly has a casing cap 30, a damper cap 31, damper rubbers 32, 33, a socket 1, and a guide pipe 34. Casing cap 30 is a part mounted on an end portion of control cable 50 as described above, and socket 1 is a part mounted on bracket 2 as described above.

The mounting of this socket 1 on bracket 2 is carried out by introducing a mounted portion 17 of socket 1 into a mounting hole 22 through an opening 21 of bracket 2 shown in FIG. 2 and thereafter rotating socket 1 about the axial line relative to bracket 2, which will be detailed later.

Damper rubbers 32, 33 are provided between casing cap 30 and socket 1 for damping oscillation, and damper cap 31 is provided for preventing damper rubbers 32, 33 from dropping off. Guide pipe 34 is mounted on the side of socket 1 that is opposite to control cable 50.

Figure 3:
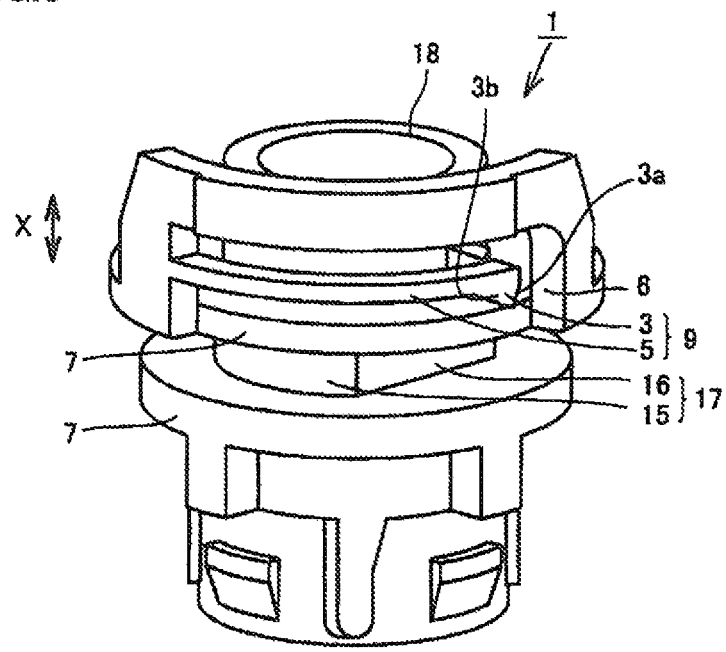
FIG. 3 is a perspective view schematically showing an example of a socket of the terminal support device mounting structure in an embodiment of the present invention.

Referring to FIG. 3, the above-noted socket 1 mainly has a rotation restriction portion 6, a pair of flanges 7, 7, a flexible portion 9, and mounted portion 17. Mounted portion 17 is a portion introduced (inserted) into opening 21 of bracket 2 as described above and mainly has an introduction portion 16 and a sliding contact portion 15.

Figure 4:
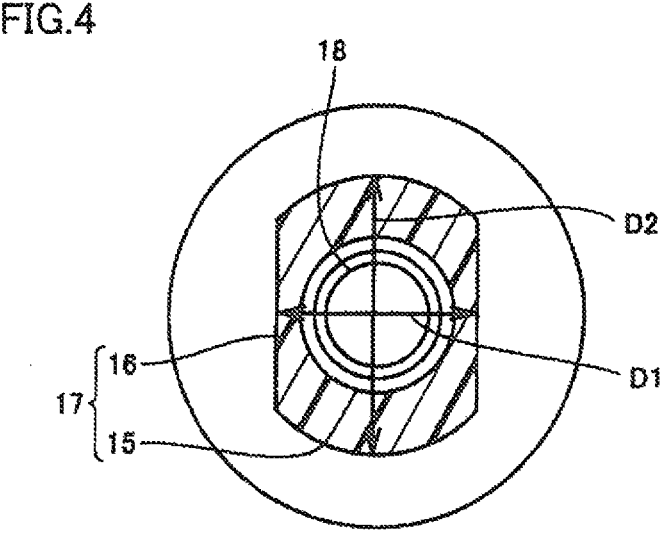
FIG. 4 is a cross-sectional view schematically showing a state of the socket as viewed in the axial line direction when a pair of flanges of the socket is cut therebetween through a plane parallel to the flanges.

Referring to FIG. 4, introduction portion 16 is a portion of mounted portion 17 that is defined by two generally straight lines in cross section. This introduction portion 16 is formed to be able to be introduced into opening 21 of bracket 2 and has a width D1. Sliding contact portion 15 is a portion of mounted portion 17 that is defined by two generally arc portions in cross section. This sliding contact portion 15 is a portion that comes into sliding contact with an arc-shaped wall of mounting hole 22 of bracket 2 when socket 1 is rotated about the axial line relative to bracket 2, and has a width (diameter) D2 larger than width W of opening 21 (FIG. 2).

Referring to FIG. 3, a pair of flanges 7, 7 is provided so as to sandwich the aforementioned mounted portion 17 therebetween. A pair of flanges 7, 7 each has a diameter larger than width D2 of sliding contact portion 15 of mounted portion 17 so as to extend outward from mounted portion 17. Accordingly, a pair of flanges 7, 7 is formed to sandwich a thick portion 23 on the periphery of mounting hole 22 of bracket 2 when socket 1 is rotated about the axial line relative to bracket 2.

Figure 5:
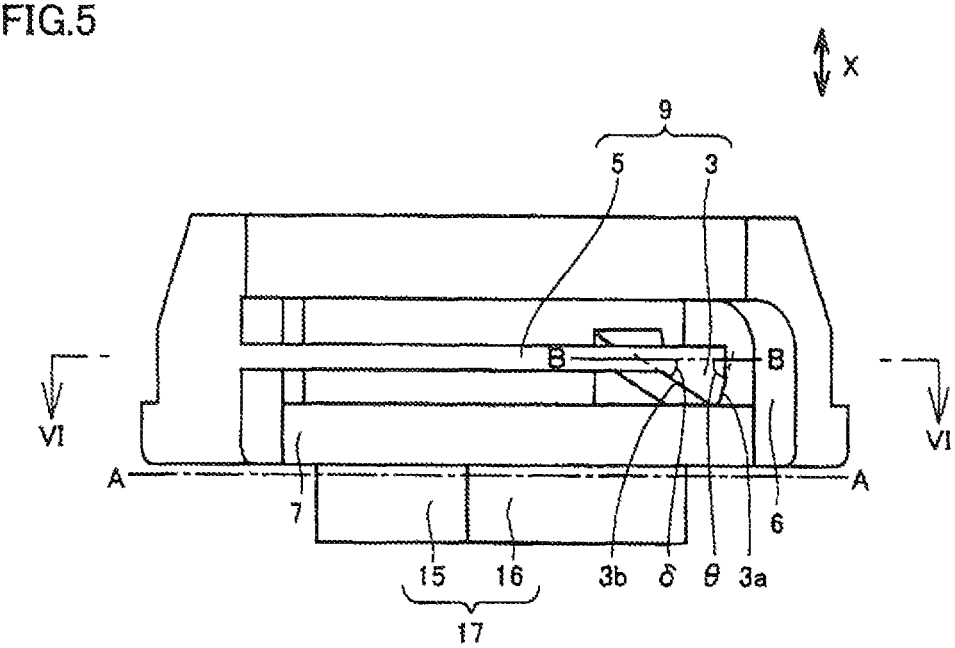
FIG. 5 is a partial side view schematically showing an example of the socket of the terminal support device mounting structure in an embodiment of the present invention.
Figure 6:
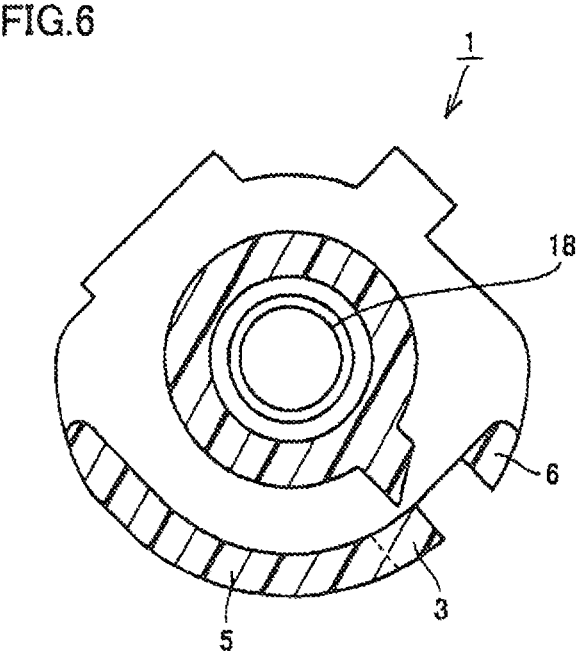
FIG. 6 is a cross-sectional view schematically showing the socket along VI-VI line in FIG. 5.

Referring to FIG. 3, FIG. 5, and FIG. 6, flexible portion 9 is formed of a flexible member and has an arm 5 and a pawl 3. Arm 5 is a portion that supports pawl 3.

Pawl 3 is a portion that is engaged with an engagement portion 4 (FIG. 2) of bracket 2 when socket 1 is fixed to bracket 2. Flexible portion 9 having arm 5 and pawl 3 is provided at a position spaced apart from a boundary surface (surface shown by a dashed-dotted line A-A in FIG. 5) between mounted portion 17 and flange 7 of a pair of flanges 7, 7 that is located on the flexible portion 9 side, as shown in FIG. 5. Accordingly, flexible portion 9 is provided at a position spaced apart from thick portion 23 (FIG. 2) of bracket 2 in the axial line direction X when socket 1 is rotated about the axial line relative to bracket 2. Flexible portion 9 having arm 5 and pawl 3 is provided so as to extend circumferentially around a though hole 18 as shown in FIG. 6.

In FIG. 5, the boundary surface A-A is illustrated as being shifted from the actual boundary surface, for the sake of convenience of illustration of the drawing.

Referring to FIG. 3, FIG. 5, and FIG. 6, rotation restriction portion 6 is a portion that comes into abutment with engagement portion 4 of bracket 2 for restricting rotation of socket 1 after pawl 3 passes over engagement portion 4 (FIG. 2) when socket 1 is rotated about the axial line relative to bracket 2. Therefore, rotation restriction portion 6 is located on the same circumference as pawl 3 as shown in FIG. 6. As shown in FIG. 6, there is a space along the circumferential direction between pawl 3 and rotation restriction portion 6. This space is a portion in which engagement portion 4 (FIG. 2) of bracket 2 is seated when socket 1 is fixed to the bracket. Rotation restriction portion 6 is provided so as to extend from the side surface of flange 7 along the axial line direction X on the opposite side to mounted portion 17 with respect to the boundary surface A-A, as shown in FIG. 5.

Pawl 3 is formed so as to be engaged with engagement portion 4 for preventing rotation of socket 1 when, from the state in which engagement portion 4 (FIG. 2) of bracket 2 seated in the space between pawl 3 and rotation restriction portion 6, socket 1 is rotated in the direction in which engagement portion 4 faces toward pawl 3, that is, in the opposite direction (hereinafter referred to as the removing direction) to the mounting direction. For example, as shown in FIG. 5, the inclination angle θ of a surface 3a of pawl 3 in engagement with engagement portion 4 during rotation in the removing direction relative to the rotation direction (a dashed two-dotted line B-B) is formed to be larger than the inclination angle δ of a surface 3b of pawl 3 in abutment with engagement portion 4 during rotation in the opposite direction (the mounting direction) to the removing direction relative to the rotation direction B-B.

Referring to FIG. 2, bracket 2 mainly has opening 21, mounting hole 22, thick portion 23, and engagement portion 4. Opening 21 is a portion into which introduction portion 16 of socket 1 is introduced. Width W of opening 21 is approximately equal to width D1 of introduction portion 16 of socket 1. As long as introduction portion 16 can be introduced into opening 21, width W of opening 21 may be larger or smaller than width D1 of introduction portion 16. For example, when bracket 2 is formed of metal and socket 1 is formed of resin, even if width W of opening 21 of bracket 2 is slightly smaller than width D1 of introduction portion 16, introduction portion 16 can be introduced into opening 21 by deforming socket 1.

Mounting hole 22 is in communication with opening 21 and has an arc-shaped portion 24 having a diameter D0 larger than width W of opening 21. This mounting hole 22 is a portion in which mounted portion 17 of socket 1 introduced from opening 21 is seated. With mounted portion 17 being seated in mounting hole 22, sliding contact portion 15 of socket 1 can come into sliding contact with arc-shaped portion 24 of mounting hole 22.

Thick portion 23 is a portion having an approximately flat plate shape located around opening 21 and mounting hole 22. When socket 1 is assembled with bracket 2, thick portion 23 is partially sandwiched between a pair of flanges 7, 7 of socket 1. Engagement portion 4 is provided, for example, to extend from the outer peripheral portion of the surface of thick portion 23 in the axial line direction X.

Figure 7:
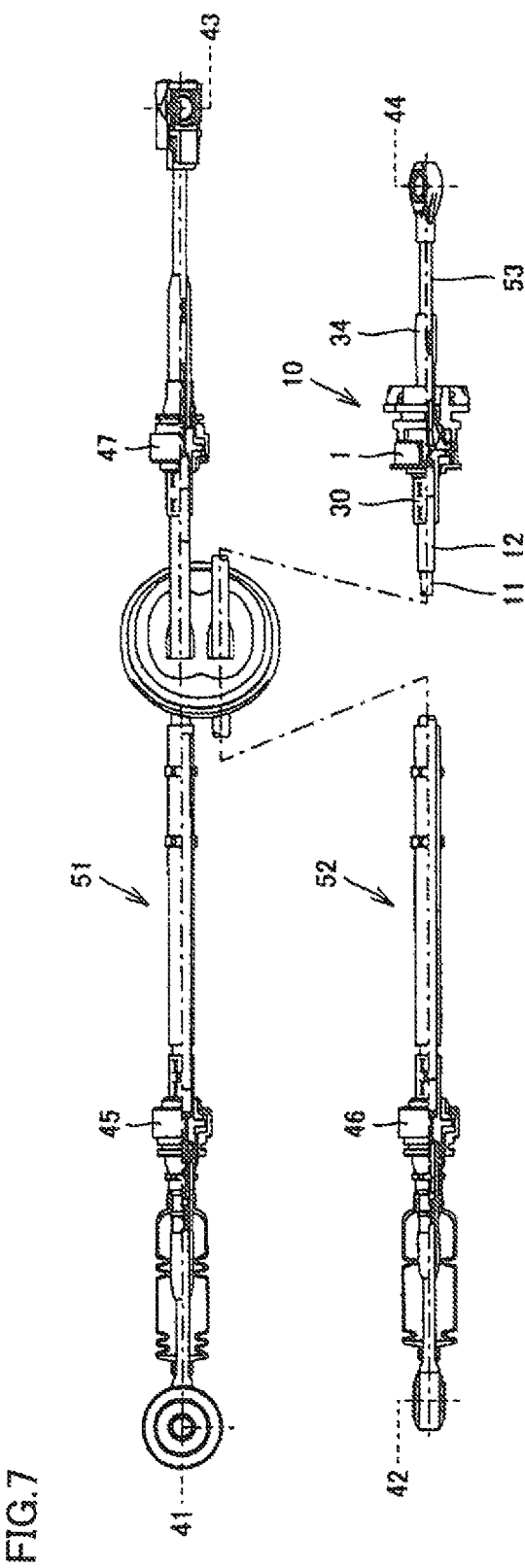
FIG. 7 is a diagram schematically showing that the terminal support device of the terminal support device mounting structure in an embodiment of the present invention is mounted on a control cable.

A mounting state of terminal support device 10 in the terminal support device mounting structure in the present embodiment will now be described with reference to FIG. 7.

Terminal support device 10 in the present embodiment is mounted, for example, on an end portion of a shift control cable or an end portion of a select control cable. FIG. 7 shows a construction in which terminal support device 10 in the present embodiment is mounted on an end portion of a select lever side 44 of a select control cable 52. However, terminal support device 10 in the present embodiment may be mounted on an end portion of a transmission side 42 of select control cable 52 in place of a terminal support device 46, or may be mounted on an end portion of a shift lever side 43 of a shift control cable 51 in place of terminal support device 47, or may be mounted on an end portion of a transmission side 41 of shift control cable 51 in place of a terminal support device 45.

Control cables 51, 52 each mainly have an outer casing 12 and an inner cable 11. Inner cable 11 is slidably inserted through outer casing 12. Therefore, in the mounting of terminal support device 10 on the control cable, outer casing 12 of control cable 52 is inserted through casing cap 30 of terminal support device 10.

In this way, control cables 51, 52 can be fixed to the vehicle body side by mounting terminal support device 10 in the present embodiment on control cables 51, 52 and mounting terminal support device 10 on bracket 2 shown in FIG. 2.

Figure 8:
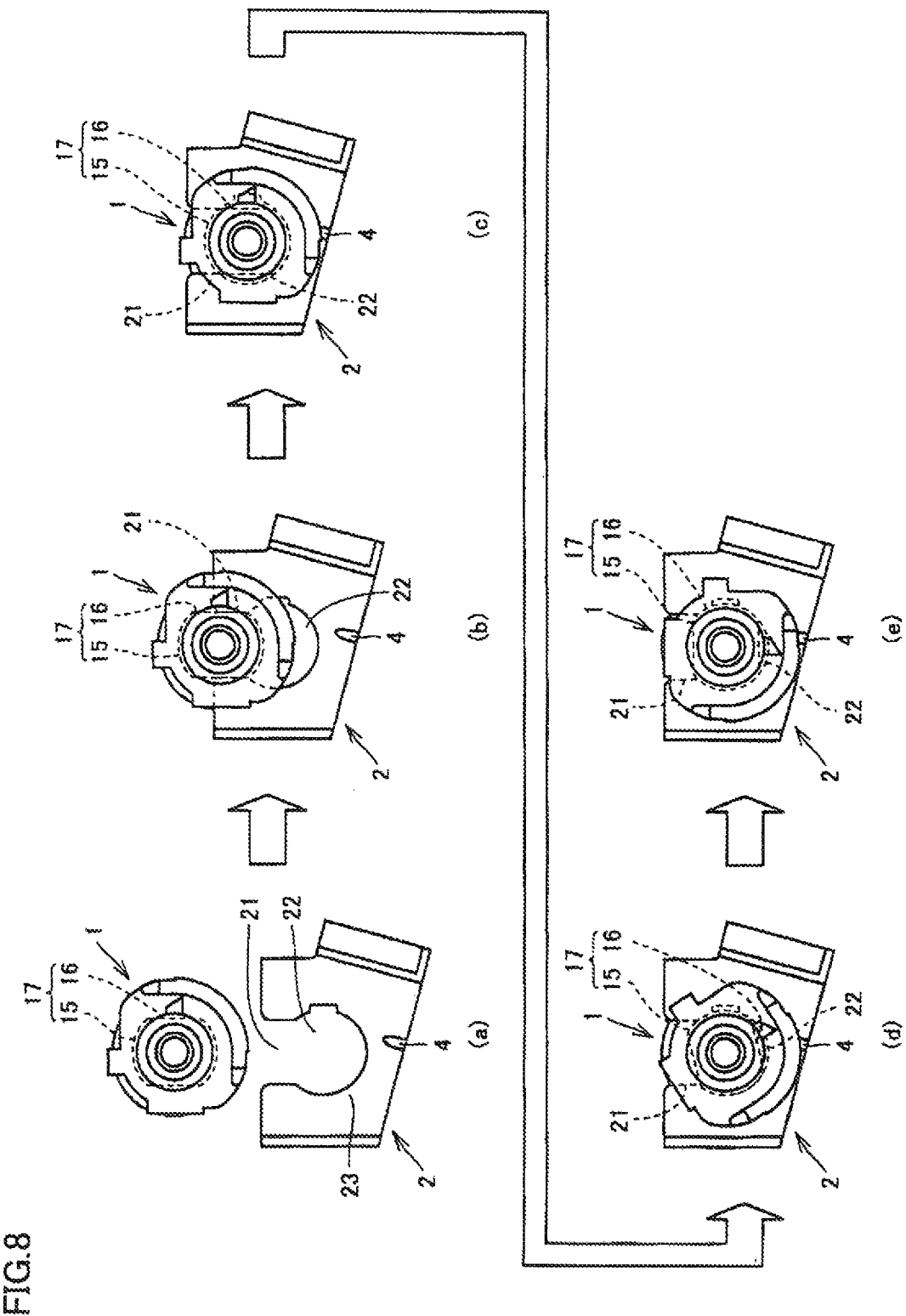
FIG. 8 shows plan views (a) to (e) showing a series of operations for fixing the socket with the bracket.

A procedure of fixing socket 1 to bracket 2 will now be described with reference to FIG. 8. First, as shown in FIG. 8(a), socket 1 is arranged above opening 21 of bracket 2. Next, as shown in FIG. 8(b), introduction portion 16 of socket 1 is introduced through opening 21 of bracket 2. As shown in FIG. 8(c), mounted portion 17 of socket 1 is seated in mounting hole 22 of bracket 2. As shown in FIG. 8(d) and FIG. 8(e), then, socket 1 is rotated 90 degrees about the axial line with the axial line direction X as a rotation axis, whereby socket 1 is rotated relative to bracket 2 with sliding contact portion 15 in sliding contact with arc-shaped portion 24, and socket 1 is fixed to bracket 2. FIG. 8(e) shows that the fixing of socket 1 with bracket 2 is completed.

Figure 9:
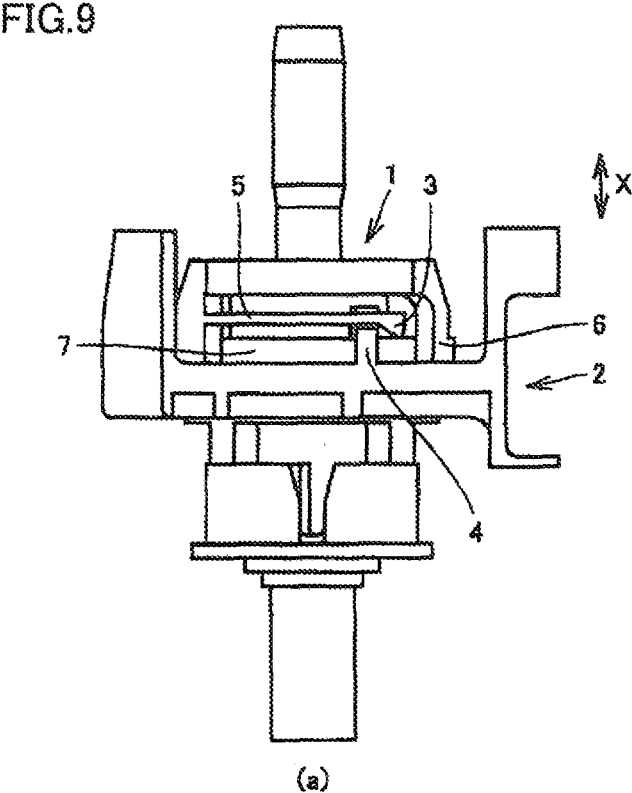
FIG. 9 shows a side view (a) of the socket and the bracket in a state immediately before a pawl is engaged with an engagement portion shown in FIG. 8(d), and a side view (b) of the socket and the bracket in a state immediately after the pawl is engaged with the engagement portion shown in FIG. 8(e).
Figure 9:
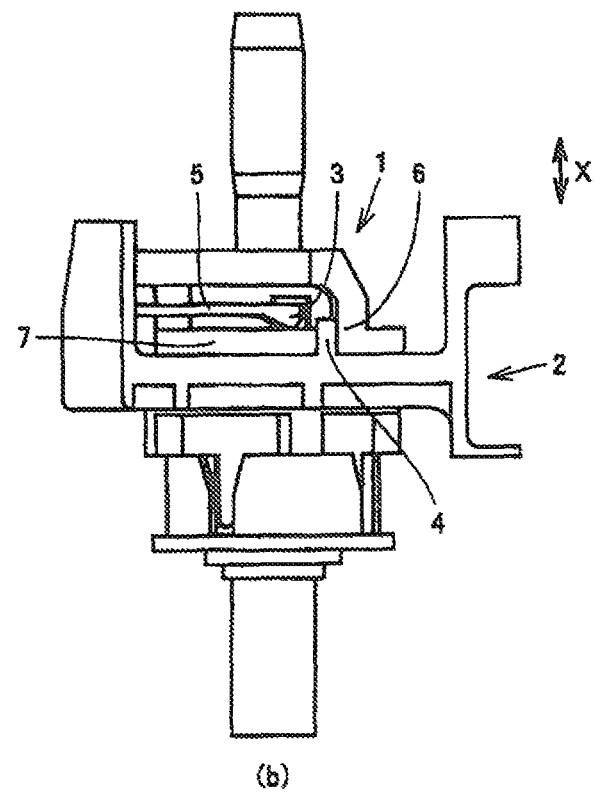
Figure 10:
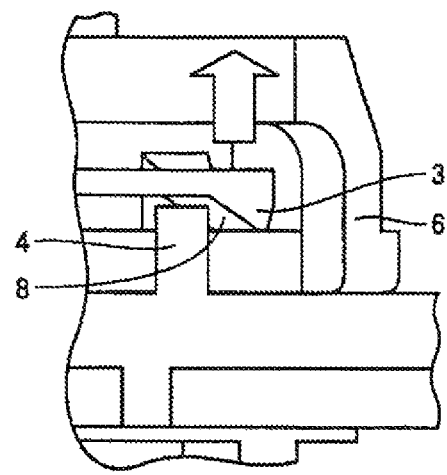
FIG. 10 shows a partial enlarged view (a) of FIG. 9(a) and a partial enlarged view (b) of FIG. 9(b).
Figure 10:
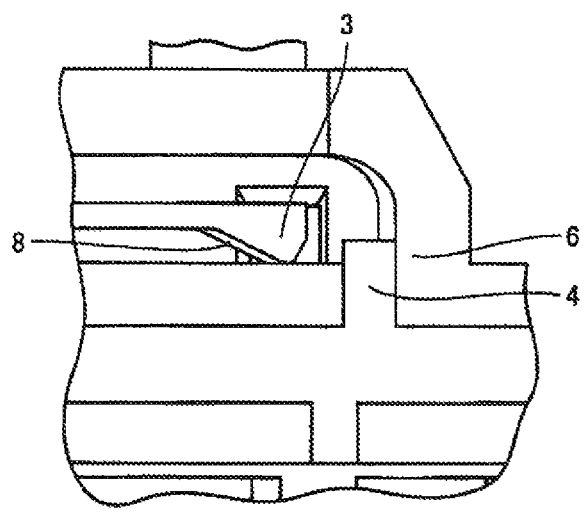
Figure 11:
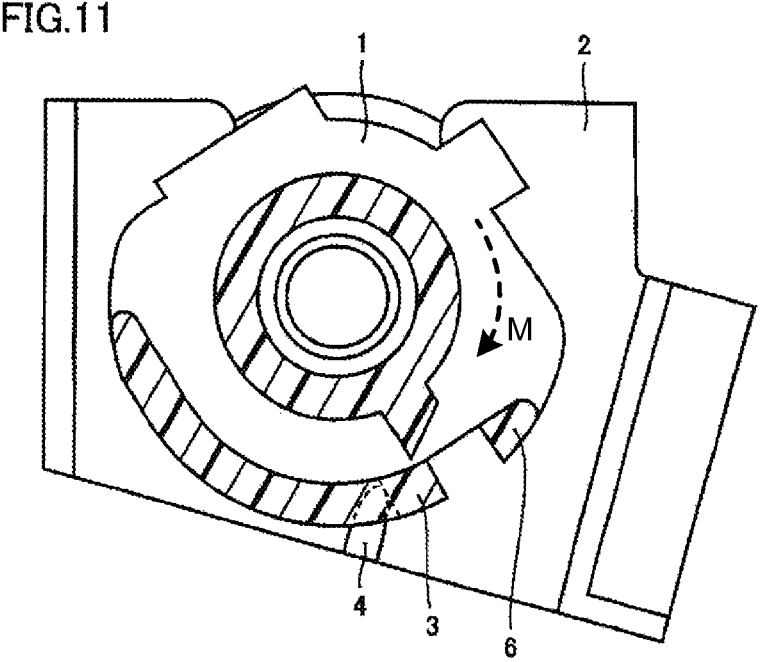
FIG. 11 shows a construction (a) in which the socket is cut through a plane at a height of an arm in a state immediately before the pawl is engaged with the engagement portion shown in FIG. 8(d), and a construction (b) in which the socket is cut through the plane at a height of the arm in a state immediately after the pawl is engaged with the engagement portion shown in FIG. 8(e).
Figure 11:
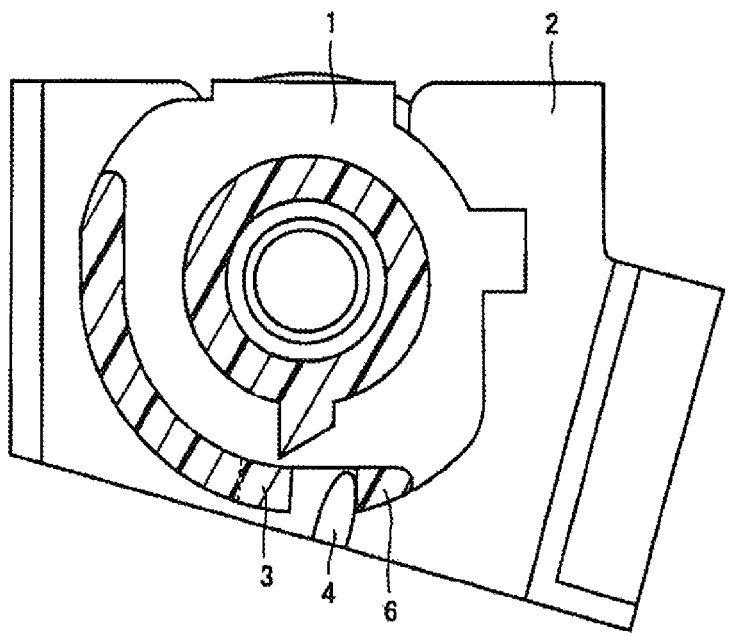

Next, a manner in which pawl 3 is engaged with engagement portion 4 in the engagement operation described above will be described with reference to FIG. 9 to FIG. 11.

Here, FIG. 9(a), FIG. 10(a), and FIG. 11(a) correspond to the state in FIG. 8(d), and FIG. 9(b), FIG. 10(b), and FIG. 11(b) correspond to the state in FIG. 8(e).

As shown in FIG. 9(a), FIG. 10(a), and FIG. 11(a), the rotation of socket 1 allows pawl 3 provided in arm 5 to come close to engagement portion 4. An inclination portion 8 of pawl 3 then comes into contact with the end portion of engagement portion 4, and inclination portion 8 rides on the top portion of engagement portion 4. Here, arm 5 is flexed upward. Here, inclination portion 8 is provided so as to reduce the resistance when pawl 3 rides on engagement portion 4. Accordingly, pawl 3 can easily ride on engagement portion 4. Further rotation of socket 1 allows inclination portion 8 of pawl 3 to pass through engagement portion 4 while sliding on the top surface of engagement portion 4.

As shown in FIG. 9(b), FIG. 10(b), and FIG. 11(b), after pawl 3 passes through engagement portion 4, arm 5 is no longer flexed and returns to the original position. In a state in which the assembly of socket 1 and bracket 2 is completed, engagement portion 4 lies between pawl 3 and rotation restriction portion 6. Therefore, if socket 1 is further rotated in the mounting direction M (FIG. 11(a)) engagement portion 4 comes into abutment with rotation restriction portion 6. Accordingly, the further rotation of socket 1 in the mounting direction can be restricted. If socket 1 is about to rotate in the removing direction opposite to the mounting direction, engagement portion 4 comes into abutment with the end portion of pawl 3, thereby preventing socket 1 from rotating in the removing direction.

Operation effects of the present embodiment will now be described. Arm 5 and pawl 3 are provided at a position spaced apart from thick portion 23 of bracket 2 in the axial line direction X when socket 1 and bracket 2 are assembled. Accordingly, when socket 1 is assembled with bracket 2, pawl 3 does not slide on thick portion 23 over a long distance, thereby preventing breakage of arm 5. When socket 1 is removed from bracket 2, arm 5 is lifted upward, and socket 1 is rotated in the opposite direction to the mounting direction. Also in this case, pawl 3 does not slide on thick portion 23 over a long distance, thereby preventing breakage of arm 5.

When socket 1 is assembled with bracket 2, engagement portion 4 of bracket 2 lies between pawl 3 and rotation restriction portion 6. Accordingly, if socket 1 further rotates in the mounting direction, engagement portion 4 comes into abutment with rotation restriction portion 6 to prevent further rotation in the mounting direction. On the other hand, if socket 1 is about to rotate in the removing direction opposite to the mounting direction, engagement portion 4 comes into abutment with the end portion of pawl 3 to prevent socket 1 from rotating in the removing direction. This can prevent socket 1 from dropping off from bracket 2.

Rotation restriction portion 6 is provided so as to be able to restrict rotation of socket 1 by coming into abutment with engagement portion 4. Engagement portion 4 is a portion that is not flush with thick portion 23, and the portion of rotation restriction portion 6 that is provided so as to come into abutment with engagement portion 4 is also not flush with thick portion 23. Therefore, rotation restriction portion 6 does not come into contact with the side surface of bracket 2 and not restrict rotation of socket 1. Socket 1 thus can be rotated 90 degrees. This can prevent socket 1 from dropping off from bracket 2.

Other embodiments of the rotation restriction portion in the terminal support device mounting structure in an embodiment of the present invention will now be described with reference to FIG. 12 and FIG. 13.

Figure 12:
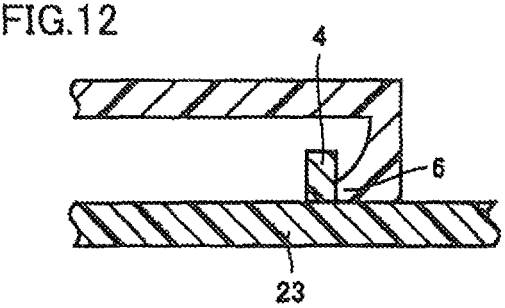
FIG. 12 is a cross-sectional view schematically showing an example of a rotation restriction portion of the terminal support device mounting structure in an embodiment of the present invention.

As shown in FIG. 12, rotation restriction portion 6 may be provided such that the height of the side surface thereof is reduced toward engagement portion 4. The height of the side surface of rotation restriction portion 6 that is in abutment with engagement portion 4 is lower than the height of engagement portion 4. With this rotation restriction portion 6, the lower side surface of engagement portion 4 comes into abutment with rotation restriction portion 6 thereby to restrict rotation of socket 1.

Figure 13:
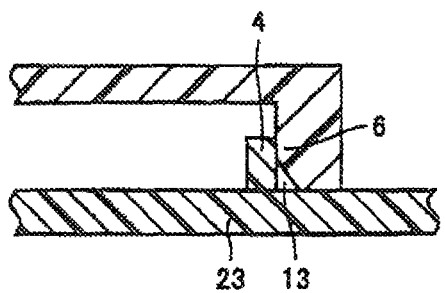
FIG. 13 is a cross-sectional view schematically showing an example of the rotation restriction portion of the terminal support device mounting structure in an embodiment of the present invention.

As shown in FIG. 13, rotation restriction portion 6 may be provided with a cut 13 at a side surface on the engagement portion 4 side. With this rotation restriction portion 6, the upper side surface of engagement portion 4 comes into abutment with rotation restriction portion 6 thereby to restrict rotation of socket 1.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

INDUSTRIAL APPLICABILITY

The present invention can be suitably used in a terminal support device mounting structure for fixing an end portion of a control cable having an inner cable slidably inserted through an outer casing.

REFERENCE SIGNS LIST 1 socket, 2 bracket, 3 pawl, 4 engagement portion, 5 arm, 6 rotation restriction portion, 7 flange, 8 inclination portion, 9 flexible portion, 10 terminal support device, 11 inner cable, 12 outer casing, 13 cut, 15 sliding contact portion, 16 introduction portion, 17 mounted portion, 21 opening, 22 mounting hole, 23 thick portion, 24 arc-shaped portion, 30 casing cap, 31 damper cap, 32 damper rubber (rear), 33 damper rubber (front), 34 guide pipe, 41, 42 transmission side, 43 shift lever side, 44 select lever side, 45, 46, 47 terminal support device, 51 shift control cable, 52 select control cable, 53 rod, W width of the opening, X axial line direction, D0 width of the mounting hole, D1 width of the introduction portion, D2 width of the sliding contact portion.

The invention claimed is:
1. A terminal support device mounting structure comprising:
a terminal support device for fixing an end portion of a control cable having an inner cable slidably inserted through an outer casing; and
a bracket for mounting said terminal support device through rotation about an axial line thereof,
said bracket including an opening, a mounting hole being in communication with said opening and having an arc-shaped portion with a diameter larger than a width of said opening, a base portion located around said opening and said mounting hole, and an engagement portion provided to extend from a surface of said base portion in an axial line direction,
said terminal support device including a socket,
said socket including
a mounted portion having an introduction portion provided so as to be able to be introduced into said opening, and a sliding contact portion having a width larger than said width of said opening for coming into sliding contact with said arc-shaped portion during said rotation,
a pair of flanges provided so as to sandwich said mounted portion therebetween for sandwiching said base portion on the periphery of said mounting hole during said rotation,
a flexible portion having a pawl to be engaged with said engagement portion during said rotation, and an arm supporting said pawl such that said pawl is configured to engage with said engagement portion, and a rotation restriction portion for restricting rotation of said socket after said rotation causes said pawl to pass over said engagement portion, said rotation restriction portion being provided to extend in said axial line direction so as to be able to restrict rotation of said socket by coming into abutment with said engagement portion, said arm and said pawl being located at a position spaced apart from said base portion in said axial line direction during said rotation.

2. The terminal support device mounting structure according to claim 1, wherein said engagement portion is a projection, and said pawl is formed so as to be engaged with said engagement portion to prevent rotation in an opposite direction to a mounting direction when said socket rotates in the opposite direction to the mounting direction.

3. The terminal support device mounting structure according to claim 1, wherein when said socket is assembled with said bracket, said engagement portion of said bracket lies between said pawl and said rotation restriction portion.

4. The terminal support device mounting structure according to claim 1, wherein said rotation restriction portion is provided so as to extend along said axial line direction from one of said flanges positioned at said flexible portion-side with respect to said mounted side.

5. The terminal support device mounting structure according to claim 1, wherein said engagement portion extends away in said axial line direction from both a first flat surface and a second flat surface of said base portion, and said engagement portion does not make contact with said rotation restriction portion between said first flat surface and said second flat surface of said base portion.

6. The terminal support device mounting structure according to claim 1, wherein said base portion includes both a first flat surface facing in said axial line direction and an opposing second flat surface facing in said axial line direction, and the engagement portion extends from the first flat surface away from said second flat surface.

* * * * *